(12) United States Patent
Nalawade et al.

(10) Patent No.: US 7,430,176 B2
(45) Date of Patent: Sep. 30, 2008

(54) ADAPTIVE TIMING OF UPDATE MESSAGES TRANSMITTED BY ROUTERS EMPLOYING THE BORDER GATEWAY PROTOCOL

(75) Inventors: Gargi Nalawade, San Jose, CA (US); Mukhtiar Shaikh, San Jose, CA (US); Muhammad Moizuddin, San Jose, CA (US); Himanshu Shah, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 579 days.

(21) Appl. No.: 11/058,540

(22) Filed: Feb. 15, 2005

(65) Prior Publication Data
US 2006/0182038 A1    Aug. 17, 2006

(51) Int. Cl.
*H04L 12/28*    (2006.01)
(52) U.S. Cl. .................. 370/238; 370/252; 370/395.31; 709/238; 709/242
(58) Field of Classification Search ................. 370/238, 370/252, 395.3, 395.21, 395.31, 400, 401; 709/238, 242
See application file for complete search history.

(56) References Cited

U.S. PATENT DOCUMENTS

| | | | |
|---|---|---|---|
| 6,392,997 B1 | 5/2002 | Chen | |
| 6,553,423 B1 | 4/2003 | Chen | |
| 6,567,380 B1 * | 5/2003 | Chen | ........................... 370/238 |
| 6,704,795 B1 | 3/2004 | Fernando et al. | |
| 2004/0081154 A1 | 4/2004 | Kouvelas | |
| 2004/0196827 A1 | 10/2004 | Xu et al. | |
| 2005/0068968 A1 * | 3/2005 | Ovadia et al. | ............... 370/396 |
| 2005/0171937 A1 | 8/2005 | Hughes et al. | |
| 2005/0180438 A1 * | 8/2005 | Ko et al. | ..................... 370/401 |
| 2006/0007939 A1 | 1/2006 | Elangovan | |
| 2006/0087977 A1 * | 4/2006 | Tatman | ....................... 370/242 |

OTHER PUBLICATIONS

Rekhter, et al., RFC 1771, entitled A Border Gateway Protocol 4 (BGP-4) Network Working Group, pp. 1-54.
Rekhter, et al., Internet Draft, entitled A Border Gateway Protocol 4 (BGP-4) (draft-ietf-idr-bgp4-20.txt), Network Working Group, pp. 1-86.
Tanenbaum, A., Computer Networks Third Edition, The TCP/IP Reference Model, Section 1.4.2, 1996, pp. 35-38.
Perlman, Radia, Interconnections: Bridges and Routers, Addison Wesley, 1992, pp. 323-329.

* cited by examiner

*Primary Examiner*—Huy D. Vu
*Assistant Examiner*—Asif H Khan
(74) *Attorney, Agent, or Firm*—Cesari and McKenna LLP

(57) ABSTRACT

A method for border nodes using the Border Gateway Protocol to advertise path updates to peer nodes in other domains involves calculating the update interval for each advertisement of an update of the same path to the same peer and advertising the update when the interval has expired. The update interval is the sum of the standard update interval and the unexpired portions of update intervals applied to previous unadvertised updates.

26 Claims, 6 Drawing Sheets

ADAPTIVE TIMING OF UPDATE MESSAGES TRANSMITTED BY ROUTERS EMPLOYING THE BORDER GATEWAY PROTOCOL

FIELD OF THE INVENTION

This invention relates to routing update protocols used in computer networks, and more particularly to adaptive timing of consecutive update messages transmitted by routers employing the Border Gateway Protocol.

BACKGROUND OF THE INVENTION

A computer network is a geographically distributed collection of interconnected communication links used to transport data between nodes, such as computers. Many types of computer networks are available, with the types ranging from local area networks (LANs) to wide area networks (WANs). The nodes typically communicate by exchanging discrete packets or messages of data according to pre-defined protocols. In this context, a protocol consists of a set of rules defining how the nodes interact with each other.

Computer networks may be further interconnected by intermediate nodes, such as routers, to extend the effective "size" of each network. Since management of a large system of interconnected computer networks can prove burdensome, smaller groups of computer networks may be maintained as routing domains or autonomous systems. The networks within an autonomous system are typically coupled together by conventional "intradomain" routers. Yet it still may be desirable to increase the number of nodes capable of exchanging data; in this case, "interdomain" routers executing interdomain routing protocols are used to interconnect nodes of the various autonomous systems.

An example of an interdomain routing protocol is the Border Gateway Protocol version 4 (BGP), which performs routing between autonomous systems by exchanging routing and reachability information among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP generally operates over a reliable transport protocol, such as the Transmission Control Protocol (TCP), to establish a TCP connection/session.

The BGP routing protocol is well known and described in detail in *Request For Comments* (*RFC*) 1771, by Y. Rekhter and T. Li (1995), *Internet Draft <draft-ietf-idr-bgp4-20.txt>* titled, *A Border Gateway Protocol 4* (*BGP-4*) by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

The interdomain routers configured to execute an implementation of the BGP protocol, referred to herein as BGP routers, perform various routing functions, including transmitting and receiving routing messages and rendering routing decisions based on routing metrics. Each BGP router maintains a routing table that lists all feasible paths to a particular network. Periodic refreshing of the routing table is generally not performed; however, BGP peer routers residing in the autonomous systems ("domains") exchange routing information under certain circumstances. For example, when a BGP router initially connects to the network, the peer routers exchange the entire contents of their routing tables. Thereafter, when changes occur to those contents, the routers exchange only those portions of their routing tables that change in order to update their peers' tables. These update messages are thus incremental update messages sent in response to changes to the contents of the routing tables and advertise only a best path to a particular network node.

The routing information exchanged by BGP peer routers typically includes destination address prefixes, i.e., the portions of destination addresses used by the routing protocol to render routing ("next hop") decisions. Examples of such destination addresses include Internet Protocol (IP) version 4 (IPv4) and version 6 (IPv6) addresses.

Broadly stated, a BGP router generates routing update messages for an adjacency or peer router by "walking-through" the routing table and applying appropriate routing policies. A routing policy is information that enables a BGP router to rank routes according to filtering and preference (i.e., the "best route"). Routing updates provided by the update messages allow BGP routers of the autonomous systems to construct a consistent view of the network topology. The update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

Each BGP node transmits to its peers updates of its routing table. In prior systems there is a fixed interval between (1) the time an update of a path to unit A is sent by unit B to unit C, and (2) a second update of the same path is sent by unit B to unit C. If the interval is too short, the "batching" of a series of updates into a single update message will be reduced or largely eliminated. This can result in "churning", that is, a unit may receive the first update from a peer after having received the second update from another peer. As a result, there is a substantial increase in the time required for the system to converge on the second update.

The fixed interval is usually a compromise such that it is long enough to provide an acceptably low amount of churning. However this means that in most cases the length of the interval is such as to result in an undesirable latency for the system to converge on a new update.

SUMMARY OF THE INVENTION

We have overcome this problem by using a variable update interval. The first time a BGP node generates an update of a path for advertisement to a peer, it advertises it to that peer immediately. The next update of the same path is not advertised to the same peer until after a standard delay interval applied to first transmission has expired. This interval is of sufficient duration that the second update of the same path will not be advertised to the same peer until the system has converged on the first update. When a third update of the same path is generated, it will not be advertised to that peer until the expiration of a delay interval comprising the sum of (1) a "penalty" interval increment applied to the second transmission, and (2) any unexpired portion of the delay interval applied to the first transmission.

The general rule is that whenever a path update is generated to be advertised to a peer, transmission of the advertisement of the update to that peer is delayed for an interval equal to the sum of the unexpired delay intervals of all previous advertisements of updates of that path to be sent to the same peer. As a result, if a series of updates of the same path are generated at intervals shorter than the standard delay interval, the delay intervals applied to successive updates will increase in duration. Conversely, if updates are generated at intervals longer than the standard interval, the delay intervals applied to succeeding updates will decay. In this fashion the delay intervals are adapted to the requirements of the system such that churning is avoided and yet no delay interval is longer than that required to avoid churning.

In the simplest case the each penalty interval increment equals the standard interval, so as to provide an additive increase or decrease in the delay interval in response to a change in the rate at which path updates are generated.

The foregoing rule is easily implemented. For example, in a memory table where unadvertised updates are temporarily stored, each entry can include a time stamp indicating when the update was recorded. The table can then be scanned periodically for any entry that is at least as early as the time of scanning, less the delay interval applied to that entry. For any such entry, the update is advertised to the appropriate peer and the entry is removed from the table.

In the preferred embodiment of the invention, the standard delay interval is used to schedule the scanning operation. Thus scanning takes place at the time the delay interval for the earliest entry has expired. This facilitates adaptation of the standard delay interval to changing system characteristics: if inordinate churning is detected, the standard interval can be increased; if no churning is detected, it can be decreased, thereby maintaining it at an optimum duration.

DETAILED DESCRIPTION OF AN ILLUSTRATIVE EMBODIMENT

Figure 1:
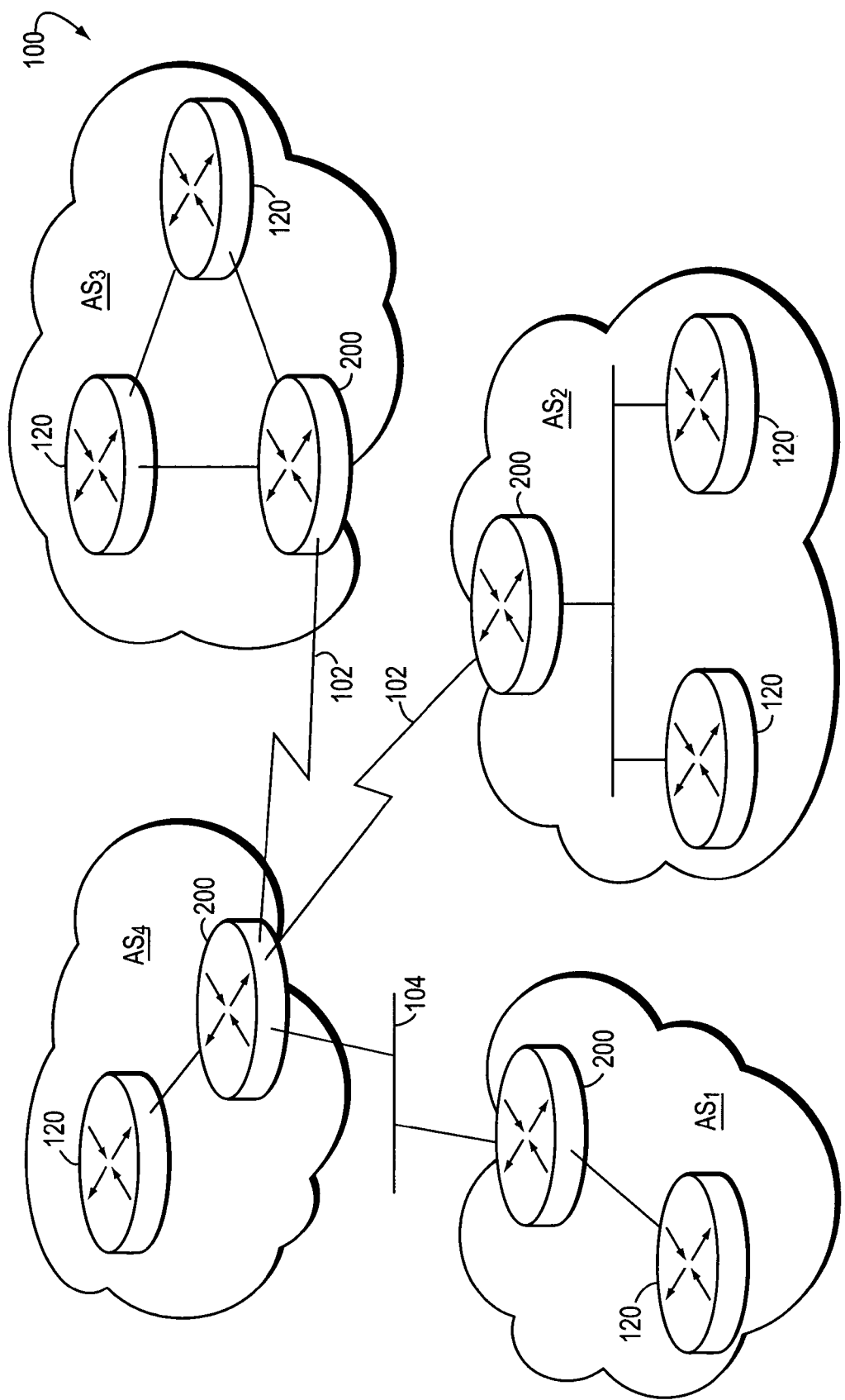
FIG. 1 is a schematic block diagram of a computer network.

FIG. 1 is a schematic block diagram of a computer network 100 comprising a plurality of routing domains or autonomous systems interconnected by intermediate nodes, such as conventional intradomain routers 120 and interdomain routers 200. The autonomous systems may include various routing domains ($AS_{1-4}$) interconnected by the interdomain routers. The interdomain routers 200 are further interconnected by shared medium networks, such as local area networks (LANs) 104, and point-to-point links 102, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood by those skilled in the art that other protocols, such as the Internet Packet Exchange (IPX) protocol, may be advantageously used with the present invention.

Figure 2:
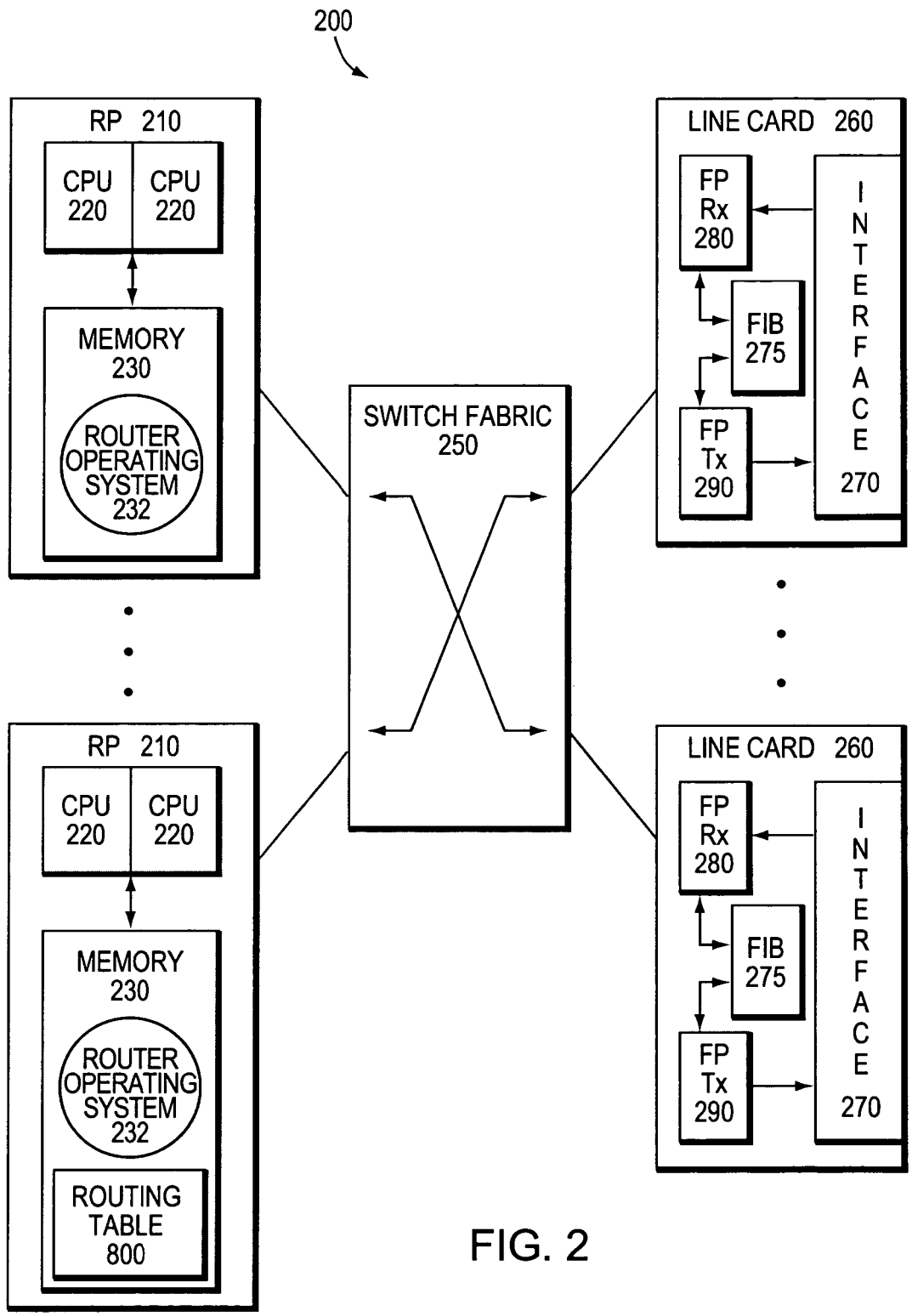
FIG. 2 is a schematic block diagram of an interdomain router.

FIG. 2 is a schematic block diagram of an interdomain router 200 that may be advantageously used with the present invention. The interdomain router 200 comprises a plurality of loosely coupled processors 210 connected to a plurality of ingress and egress line cards (line cards 260) via a high-speed switch fabric 250 such as, e.g., a crossbar interconnection or high-speed bus. Those skilled in the art will recognize that other router platforms such as, e.g., a plurality of independent nodes interconnected as a multi-node cluster, could be used in accordance with the invention. In this context, the term "node" denotes a chassis adapted to hold a plurality of modules, including processors and line cards.

The processors 210 are illustratively route processors (RPs), each having a dedicated memory 230. The memory 230 may comprise storage locations addressable by the processor for storing software programs and data structures associated with the distributed routing protocol architecture. Each processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes executing on the processor. It will be apparent to those skilled in the art that other processor and memory means, including various computer readable media, may be used for storing and executing program instructions pertaining to the inventive architecture described herein.

In the illustrative embodiment, each RP 210 comprises two central processing units (CPUs 220), e.g., Power-PC 7460 chips, configured as a symmetric multiprocessing (SMP) pair. The CPU SMP pair is adapted to run a single copy of the router operating system 232 and access its memory space 230. As noted, each RP has a memory space that is separate from the other RPs in the router 200. The processors communicate using an interprocess communication (IPC) mechanism. In addition, each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on interface 270 of an ingress line card in order to determine to which RP 210 to forward the packet. To that end, the FP Rx renders the forwarding decision using an internal forwarding information base, IFIB, of a FIB 275. Likewise, the FP Tx 290 performs lookup operations (using FIB 275) on a packet transmitted from the router via interface 270 of an egress line card.

In accordance with the invention, each FP Tx 290 also includes an adaptive timing unit 292 described below.

Figure 3:
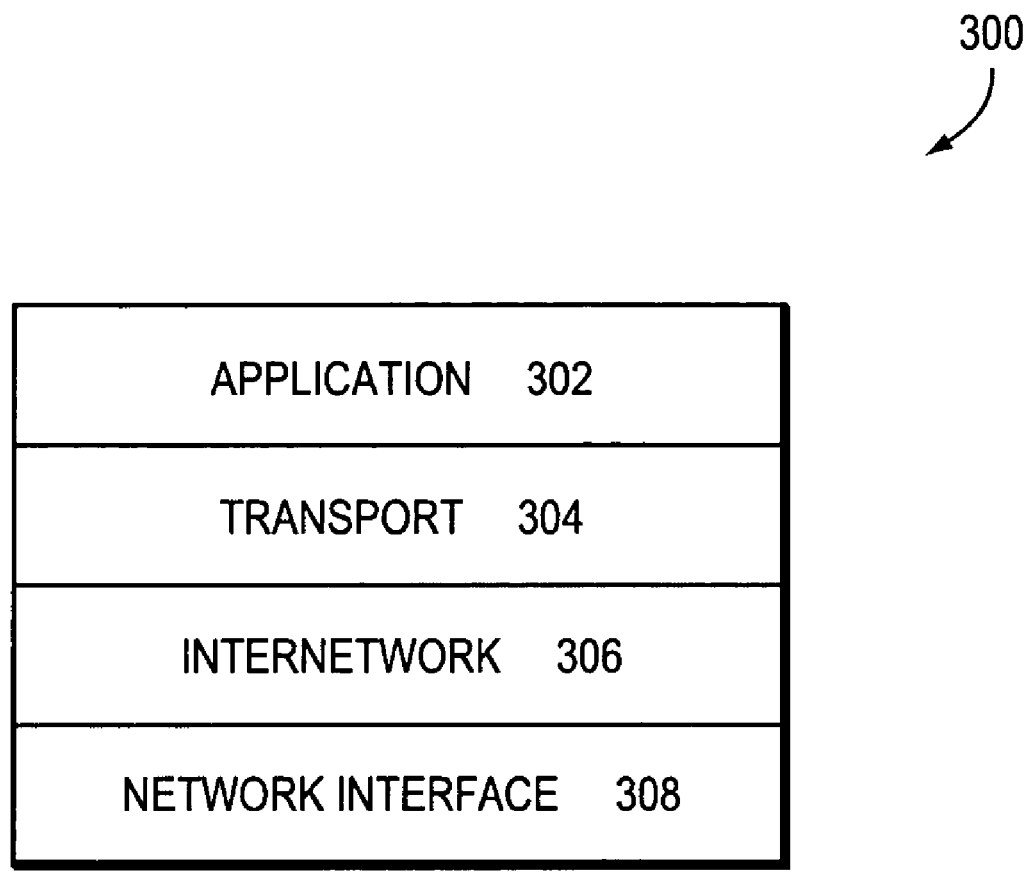
FIG. 3 is a schematic block diagram of a conventional network protocol stack.

A key function of the interdomain router 200 is determining the next node to is which a packet is sent; in order to accomplish such "routing," the interdomain routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the TCP protocol, which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that interdomain routers utilize so that they can cooperate to calculate paths through the computer network 100. An interdomain routing protocol, such as the Border Gateway Protocol version 4 (BGP), is used to perform interdomain routing (for the internetwork layer) through the computer network. The interdomain routers 200 (hereinafter "peer routers") exchange routing and reachability information among the autonomous systems over a reliable transport layer connection, such as TCP. An adjacency is a relationship formed between selected peer routers for the purpose of exchanging routing messages and abstracting the network topology. The BGP protocol uses the TCP transport layer 304 to ensure reliable communication of routing messages among the peer routers.

In order to perform routing operations in accordance with the BGP protocol, each interdomain router 200 maintains a routing table 800 that lists all feasible paths to a particular network. The routers further exchange routing information using routing update messages 400 when their routing tables change. The routing update messages are generated by an updating router to advertise best paths to each of its neighboring peer routers throughout the computer network. These routing updates allow the BGP routers of the autonomous systems to construct a consistent and up-to-date view of the network topology.

Figure 4:
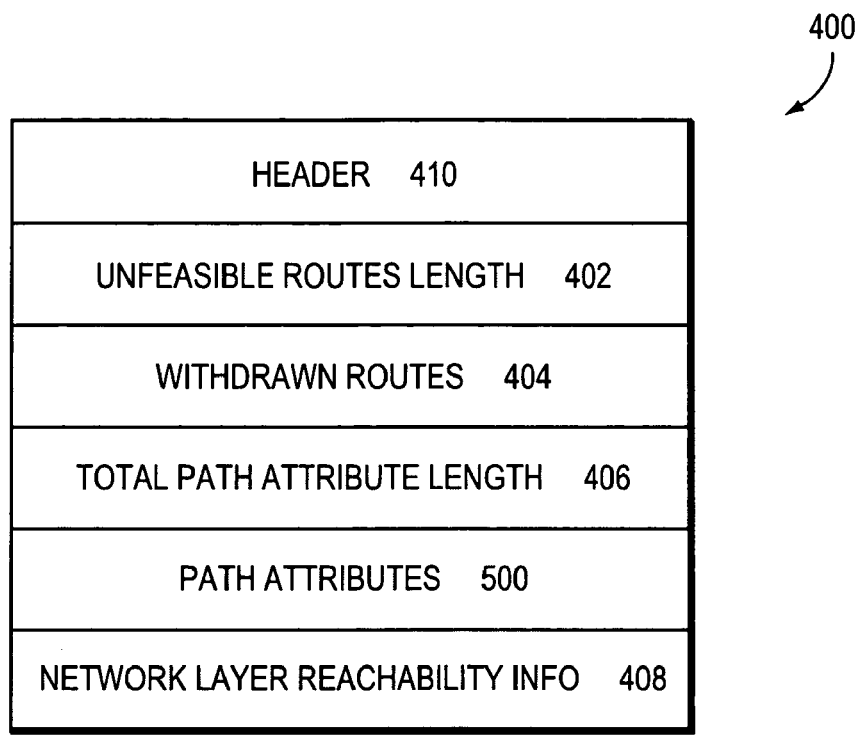
FIG. 4 is a schematic block diagram of a conventional BGP update message.

FIG. 4 is a schematic block diagram of a conventional BGP update message 400 comprising a plurality of fields appended to a header 410. An unfeasible routes length field 402 indicates the total length of a withdrawn routes field 404, which illustratively contains a list of IP address prefixes for the routes being withdrawn from service. A total path attribute length field 406 indicates the total length of a path attributes field 500 and a network layer reachability information field 408 illustratively contains a list of IP (IPv4 or IPv6) address prefixes. Note that the combination of a set of path attributes and a prefix is referred to as a "route"; the terms "route" and "path" may be used interchangeably herein. The format and function of the update message 400 is described in *RFC* 1771 and *Interconnections, Bridges and Routers*.

Figure 5:
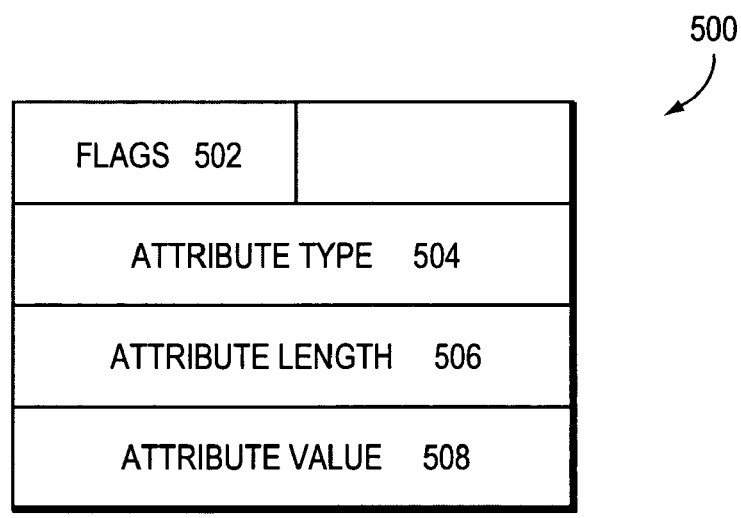
FIG. 5 is a schematic block diagram of the path attributes.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 508. In particular, the attribute type subfield 504 specifies a plurality of attribute type codes, examples of which include an autonomous system (AS) path, a multi-exit discriminator (MED) code and a communities attribute, which is a set of opaque 32-bit tags that can apply to a route. The MED is an optional non-transitive attribute having a value that may be used by an updating BGP router's decision algorithm to discriminate among multiple exit points to a neighboring autonomous system, as described further herein. Note that the path attributes are derived from a combination of configuration and protocol (i.e., propagated from the BGP protocol) information.

BGP Architecture

Figure 6:
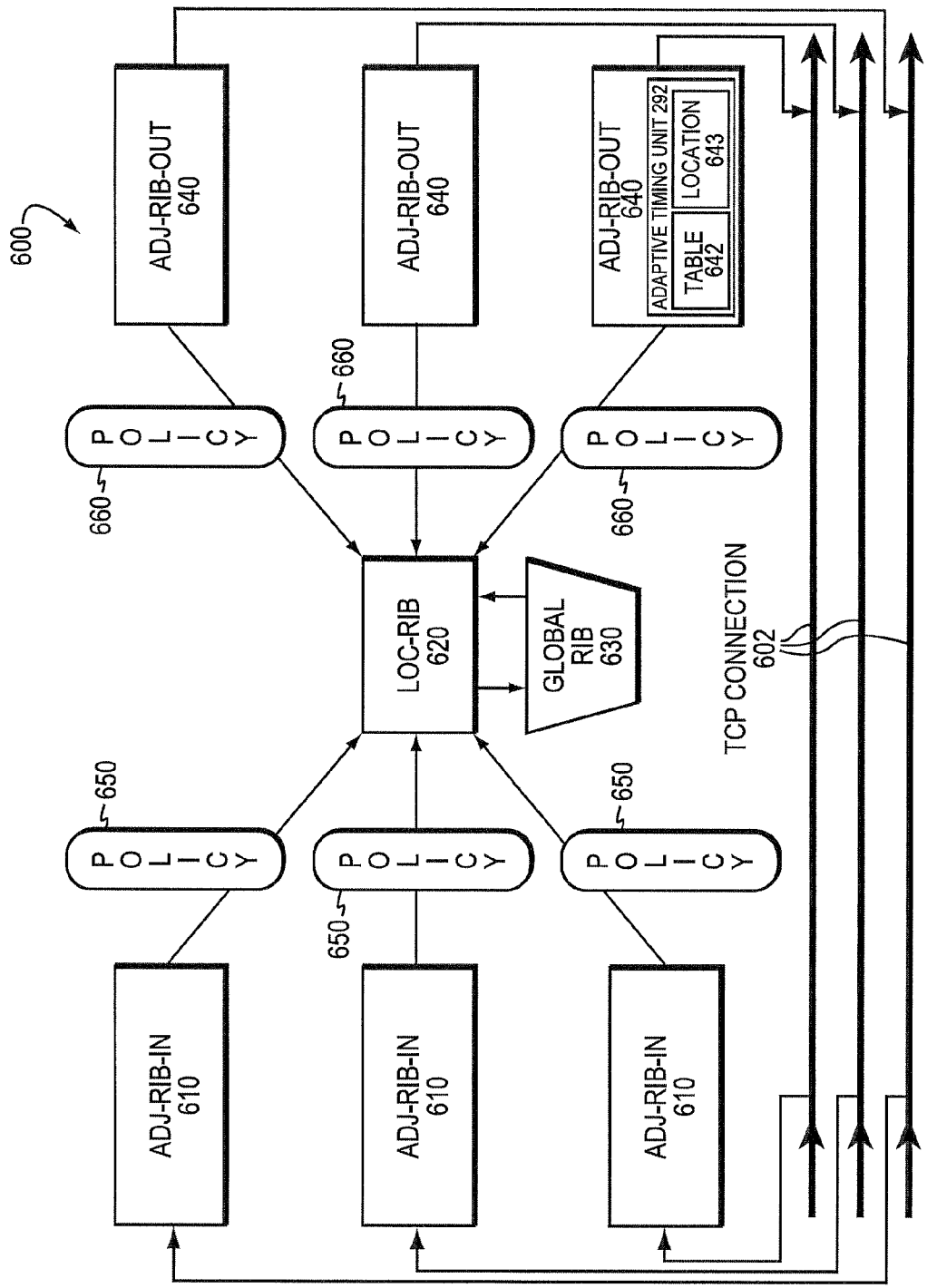
FIG. 6 is a schematic block diagram illustrating the architecture of the BGP protocol.

FIG. 6 is a schematic block diagram illustrating the architecture of the BGP protocol. Peers announce routing updates via TCP connections 602. The BGP protocol "listens" for routing update messages 400 and stores all learned routes for each connection in a BGP database. The BGP database is illustratively organized as Adjacency RIB In (Adj-RIB-In 610), Adjacency RIB Out (Adj-RIB-Out 640) and local RIB (loc-RIB 620). Each peer/TCP connection 602 is associated with an Adj-RIB-In 610 and an Adj-RIB-Out 640. Note that this association is a conceptual data construct; there is typically not a separate Adj-RIB-In/-Out database for each peer.

The BGP protocol runs inbound policy on all routes "learned" for each connection 602 and those routes that match are stored in an Adj-RIB-In 610 unique to that connection. Additional inbound policy 650 (filtering) is then applied to those stored routes, with a potentially modified route being installed in the loc-RIB 620. The loc-RIB 620 is generally responsible for selecting the best route per prefix from the union of all policy-modified Adj-RIB-In routes, resulting in routes referred to as "best paths". The set of best paths is then installed in the global RIB 630, where they may contend with routes from other protocols to become the "optimal" path ultimately selected for forwarding. Thereafter, the set of best paths have outbound policy 660 run on them, the result of which is placed in appropriate Adj-RIB-Outs 640 and announced to the respective peers via the same TCP connections 602 from which routing update messages 400 were learned.

Many of the functions or tasks performed within the BGP protocol are performed on distinct subsets of routing data, independently from one another. These tasks include (1) tracking the state of each peer according to the BGP Finite State Machine (FSM), described in *draft-ietf-idr-bgp*4-20.*txt* (Section 8), and responding to FSM events, (2) parsing update messages 400 received from each peer and placing them in an Adj-RIB-In 610 for that peer (Section 3), and (3) applying inbound policy 650 for the peer to filter or modify the received updates in the Adj-RIB-In. The BGP implementation also (4) calculates the best path for each prefix in the set of Adj-RIB-Ins and places those best paths in the loc-RIB 620 (Section 9). As the number of peers increases, the number of paths per-prefix also increases and, hence, this calculation becomes more complex. Additional tasks performed by the BGP implementation include (5) applying outbound policy 660 for each peer on all the selected paths in the loc-RIB to filter or modify those paths, and placing the filtered and modified paths in an Adj-RIB-Out 640 for that peer, as well as (6) formatting and sending update messages 400 to each peer based on the routes in the Adj-RIB-Out for that peer.

Tasks (1), (2), and (3) are defined per peer and operate on routing data learned only from that peer. Performing any of these tasks for a given peer is done independently of performing the same task for any other peers. Task (4) examines all paths from all peers, in order to insert them into the loc-RIB and determine the best path for each prefix. Tasks (5) and (6), like tasks (1), (2) and (3), are defined per peer. While both tasks (5) and (6) must access the set of best paths determined in task (4), they generate routing data for each peer independently of all of the other peers. Thus, the autonomy of each subset of the data and the tasks performed on them lend themselves to distribution across processes or threads in an n-way SMP router, or across nodes in a cluster, so long as each task has access to the required data. The required data includes (i) inbound routes from the peer for tasks (1), (2) and (3); (ii) all paths in all the Adj-RIBs-Ins for task (4); and (iii) a set of best paths for tasks (5) and (6).

In accordance with the invention the adaptive timing unit 292 is preferably included for each Adj-RIB-Out 640. The unit 292 includes a table 642 of outgoing updates, each entry in this table including an associated time stamp indicating when the entry was recorded.

Specifically, whenever an outgoing update reaches the Adj-RIB-Out 640, the table 642 is checked for any other updates of the same path. If none is found, the update can be immediately transmitted. If one is found, the new update is entered into the table 642, along with an associated time stamp. Periodically the table 642 is scanned and, if the table contains an entry which is older than (a) the time of the scan less (b) a delay interval applied to an update included in the entry, the update contained in the entry is advertised and the entry is removed from the table. The delay interval applied to an update is the sum of a standard update interval and "penalty" increments applied to the previously generated but unadvertised updates.

Other methods of calculating the increments in the delay interval can also be used.

For example, the standard delay increment might be applied to every update, resulting in a linear relationship between successive delay intervals.

Accordingly, each update will not be advertised until an interval equal to the delay interval has expired since the last advertisement of an update of the same path to the same peer. In this fashion the system adapts the length of each advertisement delay to the time interval since the last update of the same path was advertised to the same peer. If there has been no such transmission within the interval, the update is transmitted immediately. On the other hand, if there has been such a transmission, the delay interval varies according to the time that has elapsed since the transmission.

Scanning is preferably scheduled to take place at intervals equal to the standard delay interval. The standard interval can be increased or decreased from time to time to accommodate changing characteristics, and thereby assure convergence of each advertised update while avoiding undue churning.

Figure 7:
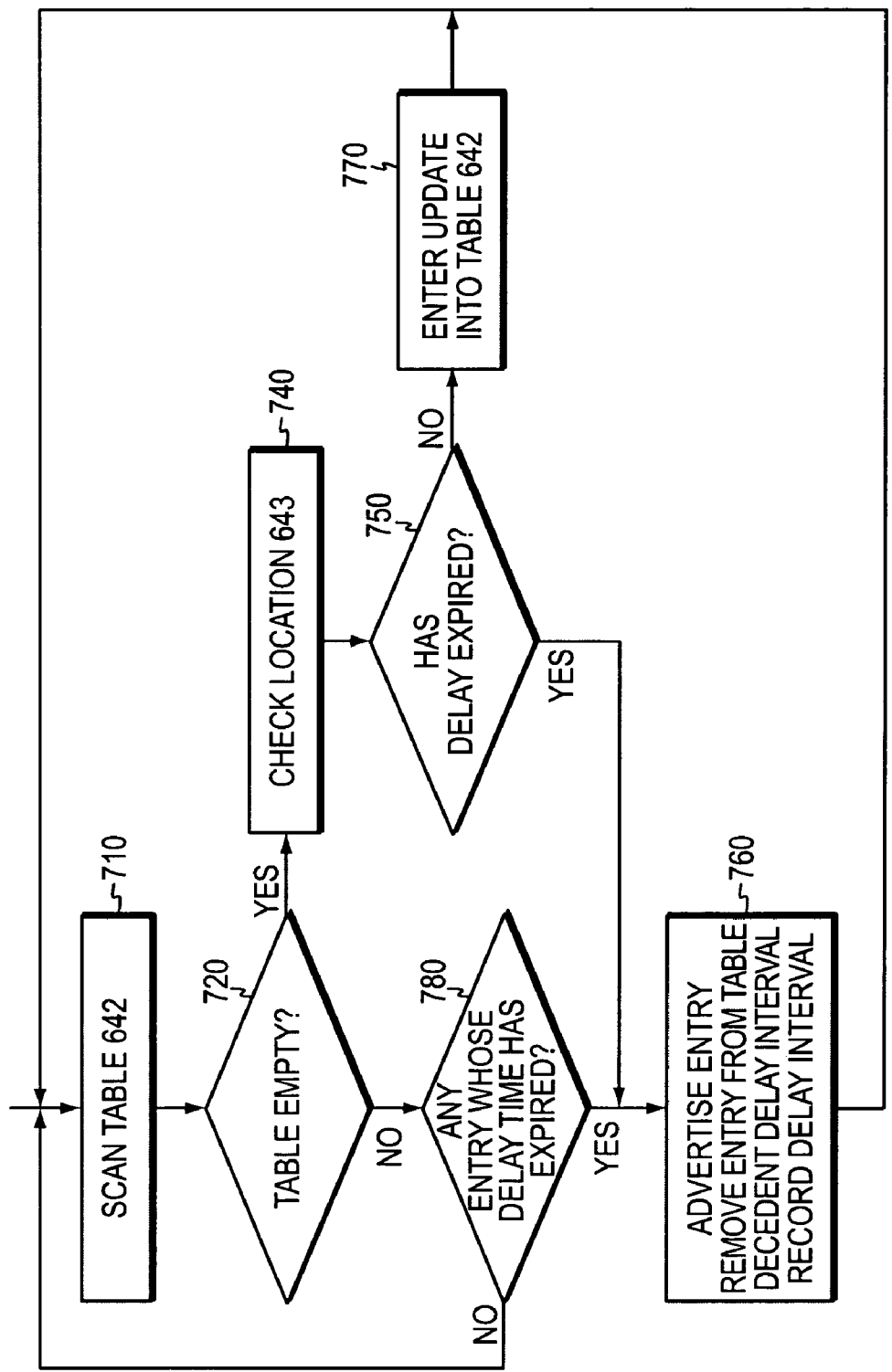
FIG. 7 is a flow chart illustrating a procedure that can used to practice the invention.

The foregoing procedure is illustrated in FIG. 7. Whenever a new update of a path is generated to be advertised to a peer, the procedure scans the table 642 (box 710) that contains entries for unadvertised updates of the same path for the same peer. If the table is empty (box 720), the procedure checks a location 643 containing the time of the last advertisement (box 740). It calculates the time of expiration of the standard delay following that advertisement and, if the delay has expired (box 750), it advertises the update (box 760). If not, it enters the update into the table 642, along with a time stamp (box 770).

Preferably, the table 642 is scanned at intervals equal to the standard interval. They may be synchronized with the ends of the delays associated with the oldest unadvertised updates contained in the table 642. If there is an unadvertised update whose delay interval has expired (box 780, the update is advertised, the entry in location 643 is reset and the update is removed from the table 642 (box 760).

It will be understood that the foregoing implementation of the invention is illustrative and one can vary the procedure without departing from the invention, as long as the system provides adaptive timing of each path-update advertisement in accordance with the timing of the most recent prior advertisement of an update of the same path to the same peer.

The invention claimed is:

1. A method of advertising network path updates to one or more peer routers, the method comprising the steps of:
   calculating an update interval for each path update, wherein each update interval is the sum of a fixed interval and increments for all previously generated but still unadvertised updates of the same path to the same peer;
   selecting each path update whose update interval has expired; and
   advertising the selected path update to that peer.

2. The method of claim 1 wherein the step of calculating the update interval comprises the step of recording in an array an entry for each path update to be advertised, the entry including a time stamp corresponding to a time the entry was recorded.

3. The method of claim 1 wherein the step of selecting each path update comprises the step of scanning the array for any entries whose update intervals have expired.

4. The method of claim 1 wherein each of the increments is equal to the fixed interval.

5. A system for advertising network path updates to one or more peer routers, the system comprising:
   a router having a route processor adapted to calculate an update interval for each path update;
   wherein each update interval is the sum of a fixed interval and increments for all previously generated but still unadvertised updates of the same path to the same peer; and
   wherein the route processor is further adapted to select each path update whose update interval has expired and advertise the selected path update.

6. The system of claim 5 wherein the route processor is further adapted to calculate the update interval by recording in an array an entry for each path update to be advertised, the entry including a time stamp corresponding to a time the entry was recorded.

7. The system of claim 6 wherein the route processor is further adapted to select each path update by scanning the array for any entries whose update intervals have expired.

8. The system of claim 5 wherein each of the increments is equal to the fixed interval.

9. The system of claim 5 wherein the update interval increments increase as updates are recorded.

10. The method of claim 1 wherein each of the increments is based upon an unexpired portion of a delay interval associated with an unadvertised update.

11. The method of claim 1 wherein the step of advertising comprises sending a Border Gateway Protocol (BGP) update message to the peer.

12. The system of claim 6 wherein each of the increments is based upon an unexpired portion of a delay interval associated with an unadvertised update.

13. The system of claim 6 wherein the router is configured to implement a Border Gateway Protocol (BGP) and the route processor advertises the selected path update by sending a BGP update message.

14. A method comprising:
   calculating a delay interval for use with a path update message to a peer, the delay interval including an increment for each of one or more previously generated but still unadvertised path updates to the peer;
   selecting the path update message when the calculated delay interval has expired; and
   advertising the path update message to the peer.

15. The method of claim 14 wherein the delay interval further includes a fixed interval, wherein the fixed interval is summed with the increment for each of the one or more previously generated but still unadvertised path updates to the peer.

16. The method of claim 14 wherein each increment is based upon an unexpired portion of a delay interval for a previously generated but still unadvertised path update to the peer.

17. The method of claim 14 wherein each increment is equal to a fixed interval.

18. The method of claim 14 further comprising:
recording each previously generated but still unadvertised path update in a table in connection with a time stamp.

19. The method of claim 14 wherein the path update message is a Border Gateway Protocol (BGP) update message.

20. An apparatus comprising:
a table configured to store one or more previously generated but still unadvertised path updates for a peer;
a processor configured to
calculate a delay interval for use with a new path update message to the peer, the delay interval including an increment for each of the one or more previously generated but still unadvertised path updates to the peer,
select the new path update message when the calculated delay interval has expired, and
advertise the path update message to the peer.

21. The apparatus of claim 20 wherein the delay interval further includes a fixed interval, wherein the fixed interval is summed with the increment for each of the one or more previously generated but still unadvertised path updates to the peer.

22. The apparatus of claim 20 wherein each increment is based upon an unexpired portion of a delay interval for a previously generated but still unadvertised path update to the peer.

23. The apparatus of claim 20 wherein each increment is equal to a fixed interval.

24. The apparatus of claim 20 further comprising:
recording a time stamp for each previously generated but still unadvertised path update in the table.

25. The apparatus of claim 20 wherein the path update message is a Border Gateway Protocol (BGP) update message.

26. An apparatus comprising:
means for calculating a delay interval for use with a path update message to a peer, the delay interval including an increment for each of one or more previously generated but still unadvertised path updates to the peer;
means for selecting the path update message when the calculated delay interval has expired; and
means for advertising the path update message to the peer.

* * * * *

UNITED STATES PATENT AND TRADEMARK OFFICE
CERTIFICATE OF CORRECTION

PATENT NO. : 7,430,176 B2 Page 1 of 1
APPLICATION NO. : 11/058540
DATED : September 30, 2008
INVENTOR(S) : Gargi Nalawade It is certified that error appears in the above-identified patent and that said Letters Patent is hereby corrected as shown below:

<u>Column 3:</u>
Line 42, delete "that can used", substitute --that can be used--

<u>Column 4:</u>
Line 48, delete "the next node to is which", substitute --the next node to which--

Signed and Sealed this

Thirteenth Day of October, 2009

David J. Kappos
*Director of the United States Patent and Trademark Office*